United States Patent
Nicastri

(10) Patent No.: US 6,619,720 B2
(45) Date of Patent: Sep. 16, 2003

(54) BOOT LID MECHANISM FOR A CONVERTIBLE MOTOR CAR

(75) Inventor: Antonio Nicastri, Turin (IT)

(73) Assignee: Industrie Pininfarina S.p.A., Turin (IT)

( * ) Notice: Subject to any disclaimer, the term of this patent is extended or adjusted under 35 U.S.C. 154(b) by 0 days.

(21) Appl. No.: 09/911,393

(22) Filed: Jul. 25, 2001

(65) Prior Publication Data

US 2002/0011739 A1 Jan. 31, 2002

(30) Foreign Application Priority Data

Jul. 25, 2000 (EP) ............................................. 00830522

(51) Int. Cl.[7] .................................................. B60J 7/00
(52) U.S. Cl. ..................... 296/107.08; 296/76; 296/136
(58) Field of Search ............................. 296/107.08, 136, 296/76

(56) References Cited

U.S. PATENT DOCUMENTS

| | | | |
|---|---|---|---|
| 5,244,269 A | | 9/1993 | Harriehausen et al. ...... 312/247 |
| 5,533,777 A | * | 7/1996 | Kleemann et al. ...... 296/107.08 |
| 6,193,300 B1 | * | 2/2001 | Nakatomi et al. ...... 296/107.08 |
| 6,250,707 B1 | * | 6/2001 | Dintner et al. ......... 296/107.08 |
| 6,254,165 B1 | * | 7/2001 | Neubrand ............... 296/107.08 |
| 6,270,144 B1 | * | 8/2001 | Schenk ................... 296/107.08 |
| 6,352,298 B1 | * | 3/2002 | Hayashi et al. ......... 296/107.08 |

FOREIGN PATENT DOCUMENTS

| | | | | |
|---|---|---|---|---|
| DE | 19946454 A1 | * | 4/2000 | ............ 296/107.08 |
| EP | 0 361 020 A1 | | 4/1990 | |
| EP | 0 949 103 A1 | | 10/1999 | |
| GB | 2 261 022 A | | 5/1993 | |
| JP | 2001113953 A | * | 10/1999 | ............ 296/107.08 |

* cited by examiner

Primary Examiner—Stephen T. Gordon
Assistant Examiner—Lori L Coletta
(74) Attorney, Agent, or Firm—Sughrue Mion, PLLC

(57) ABSTRACT

A boot lid mechanism for the lid of the boot of a convertible motor car which includes means enabling the lid to pivot about an axis situated near the forward portion of the lid and substantially orthogonal of the longitudinal centre line of the car, this pivoting movement being accompanied by a movement towards and away from the axis.

9 Claims, 12 Drawing Sheets

BOOT LID MECHANISM FOR A CONVERTIBLE MOTOR CAR

BACKGROUND OF THE INVENTION

The present invention relates to a boot lid mechanism for a convertible motor car.

In the present description, the term "convertible" is to be understood to mean any motor car with a fold away roof, of a flexible or rigid type.

SUMMARY OF THE INVENTION

The object of the present invention is to provide a device of the type indicated above which allows the boot to open in such a way as to allow access for normal loading and unloading of luggage and for folding and unfolding the roof.

This object is achieved according to the invention by providing a boot lid mechanism having a mechanical linkage for enabling the lid to pivot about an axis situated near the forward portion of the lid and substantially orthogonal to the longitudinal center line of the car wherein the pivoting motion includes movement towards or away from the axis.

A further object of the invention is constituted by a motor car which includes a boot lid mechanism as described above.

BRIEF DESCRIPTION OF THE DRAWINGS

Advantages and characteristics of the present invention will become apparent from the detailed description which is provided hereinafter, purely by way of non-limitative example and with reference to the appended drawings, in which.

DETAILED DESCRIPTION OF THE INVENTION

A car (FIG. 1) of a convertible type with a folding roof 10 has a boot lid mechanism for the lid 12 of the boot 14 which includes two units 16 arranged one on each side of the boot 14.

Figure 1:
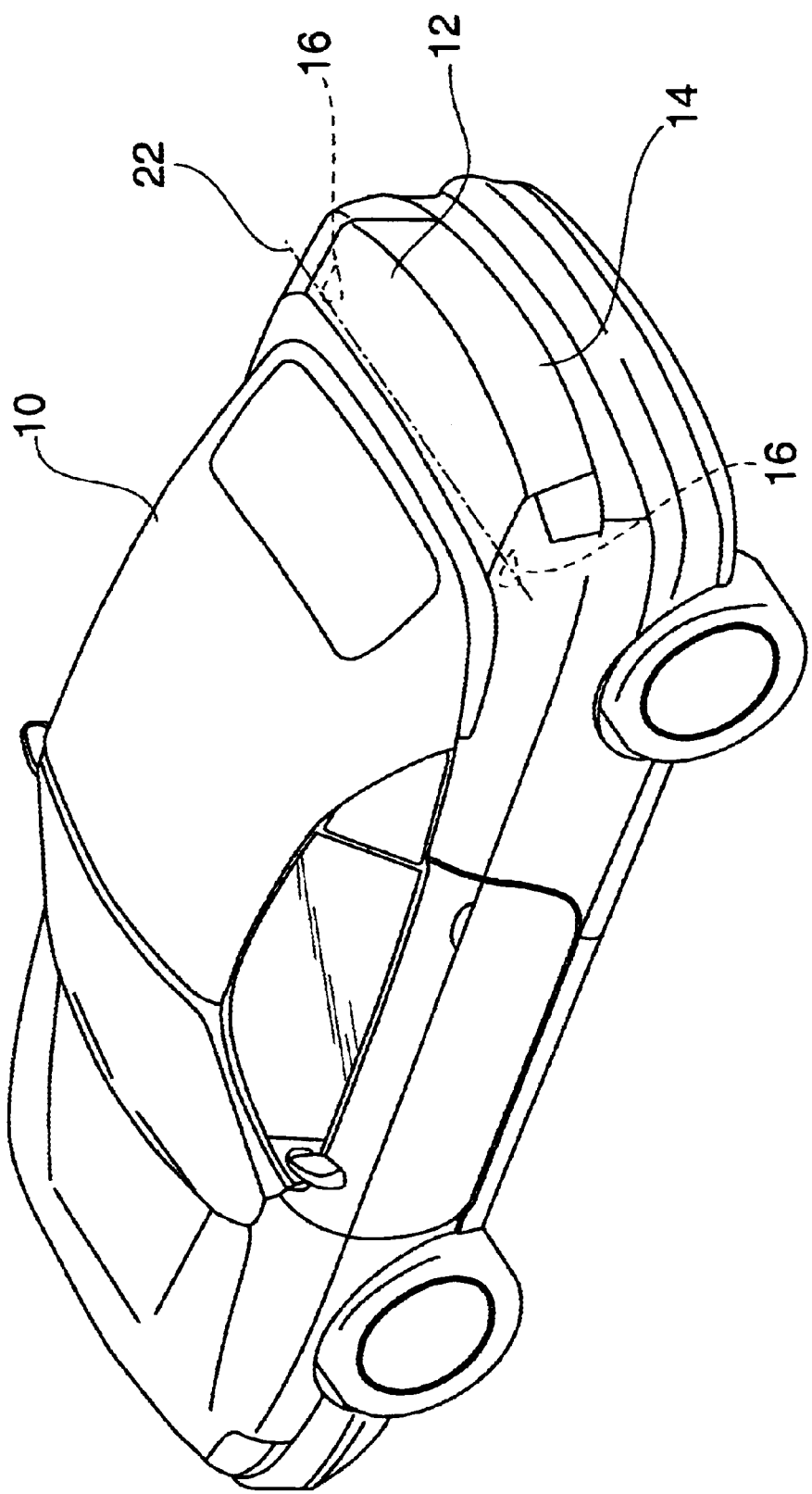
FIG. 1 is a perspective view of a convertible motor car with a boot lid mechanism of the invention.
Figure 2:
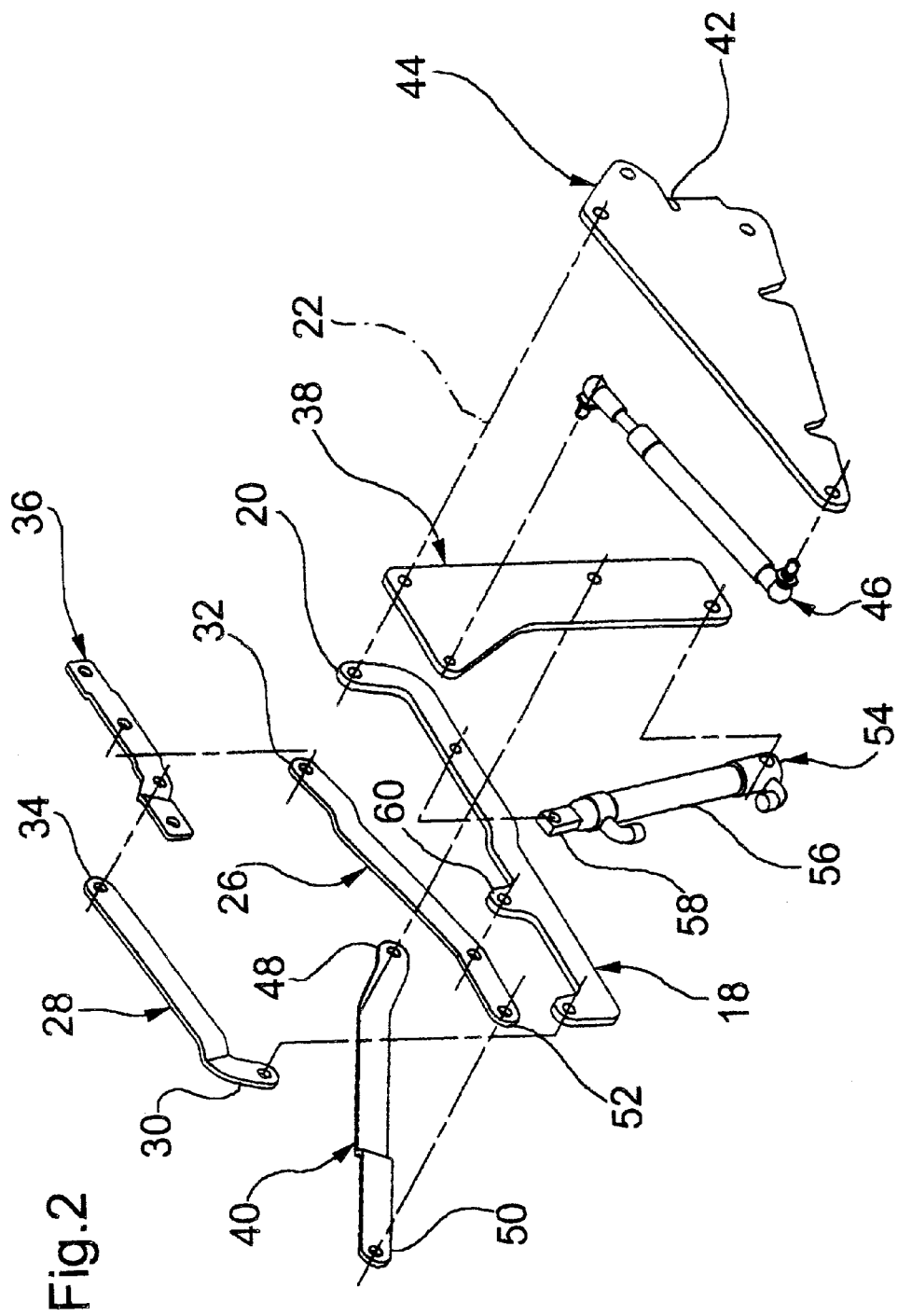
FIG. 2 is an exploded view of the main components of one unit of the boot lid mechanism of the invention.

Each of the units 16 includes (FIG. 2) a main lever 18 pivoted at one end 20 about an axis 22 situated in the forward region of the lid 12 and substantially orthogonal to the longitudinal central plane of the car (FIG. 1). At the opposite end, the main lever 18 also has a parallelogram linkage 24 (FIG. 3), to which the boot lid 12 is fixed, provided with means whereby it can move selectively relative to the main lever 18.

The parallelogram linkage 24 includes (FIG. 2) a first lever 26 pivotally attached to the median portion of the main lever 18 and a second lever 28 pivotally attached to an end portion 30 of the main lever 18. The opposite ends 32, 34 of the first and second levers 26, 28 are pivotally attached to an arm 36 fixed to the lid 12.

The means for enabling the parallelogram linkage 24 to move selectively relative to the main lever comprise an auxiliary member 38, a rod 40 and an actuator member.

The auxiliary member 38, which is advantageously in the form of a plate, is pivoted about the axis 22 and is operable to bear against a fixed stop 42, advantageously constituted by a tab projecting transversely from the overall plane of a fixed plate 44 secured to the body of the car and disposed parallel to the auxiliary member 38. A resilient damping device 46, for example a mechanical or gas operated spring is interposed between the auxiliary member 38 and the fixed plate 44.

A first end 48 of the rod 40 is fixed to the auxiliary member 38 while the second end 50 is pivotally attached to the proximal end 52 of the first lever 26.

The actuator member is operable to allow the main lever 18 to rotate relative to the auxiliary member 38 and is advantageously constituted by a fluid-operated actuator 54, for example hydraulic or pneumatic, including a cylinder 56 and a piston 58. Alternatively, the auxiliary member 38 could be constituted by an electric actuator.

The cylinder 56 is pivotally attached to a portion of the auxiliary member 38 opposite that which is pivoted about the axis 22, while the free end of the piston 58 is pivotally attached to the main lever 18.

Figure 3:
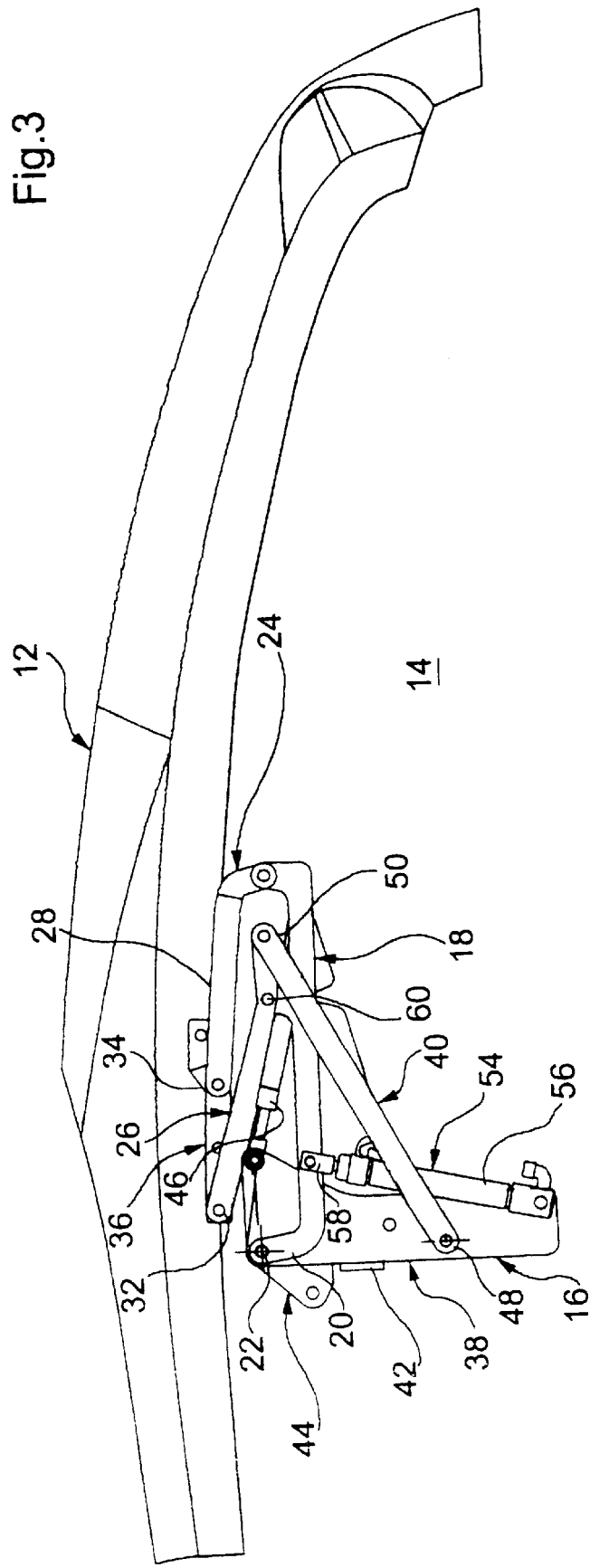
FIG. 3 is a side view of one unit of the boot lid mechanism of the invention in a first operating configuration.
Figure 4:
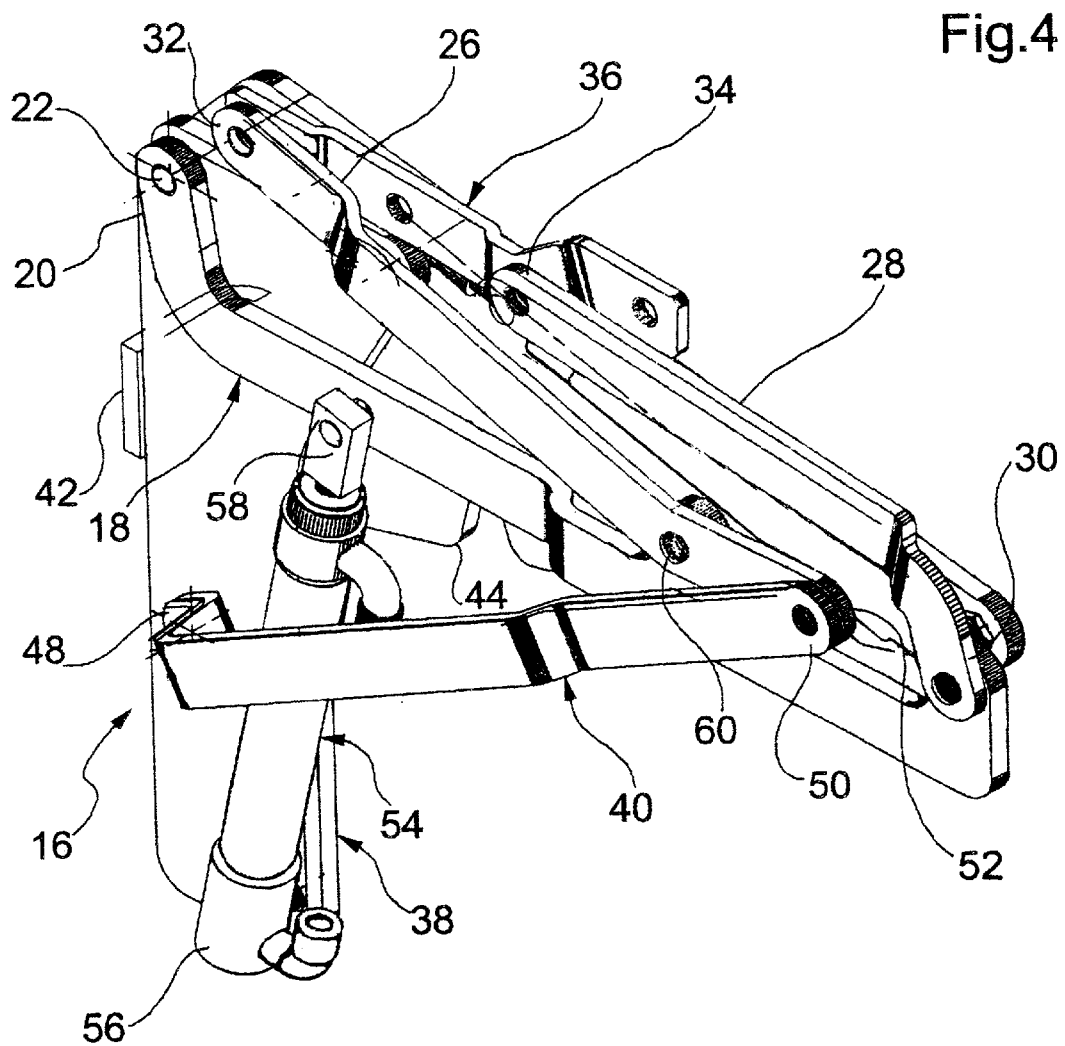
FIG. 4 is a perspective view of the unit of FIG. 3 in the same operating configuration.

FIGS. 3 and 4 illustrate one of the units 16 in its rest configuration, in which the lid 12 closes the boot 14.

When a user wants to open the lid 12 to access the boot 14 so as to load or unload baggage, he need only grasp the rear portion of the lid 12 and raise it. The lid 12 is obliged to pivot about the axis 22 together with the various components of the units 16—in particular the levers 18, 26, 28, the arm 36, the rod 40, the actuator 54 and the plate 38 which do not move relative to each other during this pivotal motion.

Figure 5:
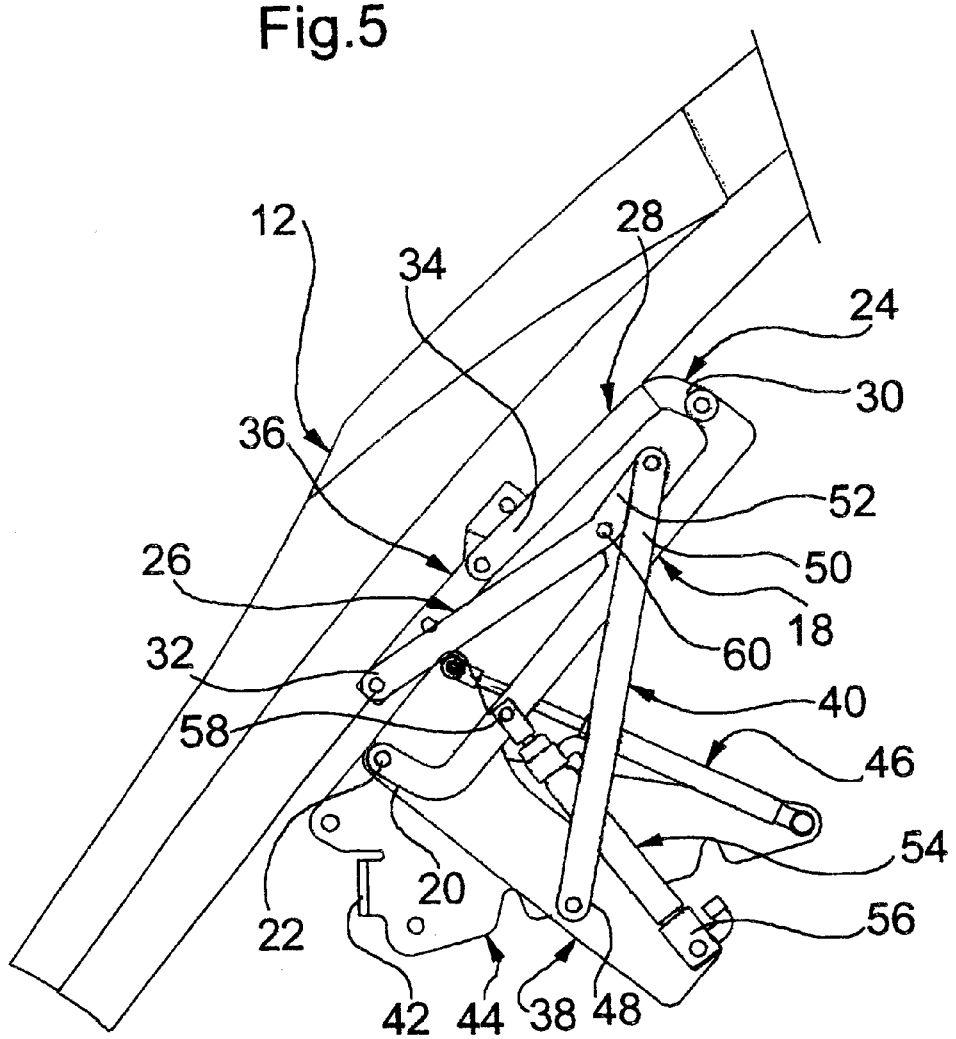
FIGS. 5 and 6 are perspective views of the unit of FIG. 3 in respective further operating configurations.

At the end of the pivotal movement, during which the members 46 exert a balancing action, the units 16 are in the configuration shown in FIG. 5 while the lid 12 has pivoted about the axis 22 so as to provide access to the boot 14 from the rear of the vehicle.

It is clear that, instead of being manual, the pivotal movement could be controlled by a conventional servo-mechanism acting, for example, on the auxiliary members 38 and achieving an effect equivalent to that described.

When, on the other hand, the lid 12 is being opened in order to fold or unfold the roof 10, the pivotal motion described above is accompanied by an additional motion controlled, in each unit 16, by activation of the actuator 54, with the piston 58 extending out of the cylinder 56.

In this way, the lever 18 has pivoted relative to the plate 38 which is caused to bear against the stop 42 of the fixed plate 44. At the same time, engagement between the plate 38 and the rod 40 causes the end 50 of this latter to exert traction on the proximal end 52 of the first lever 26.

Figure 6:
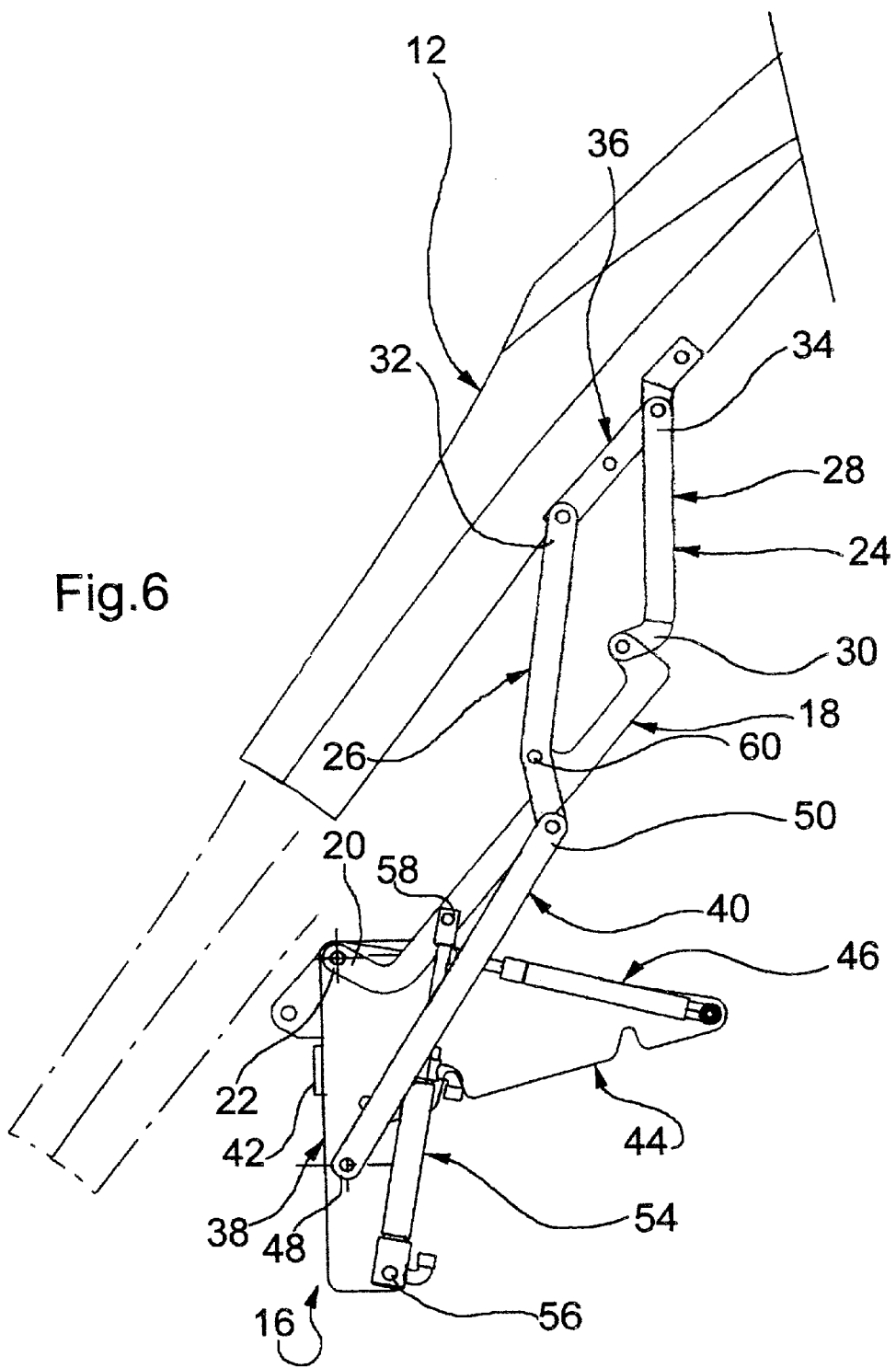

This latter is forced in turn to pivot about a fulcrum 60 constituted by its pivotal attachment to the main lever 18, thereby causing the entire parallelogram linkage 24 to pivot, along with the lid 12 fixed thereto (FIG. 6).

In this way, the lid 12 not only pivots but moves away from the axis 22, leaving a free passage between its forward portion and the facing parts of the car, thereby allowing the roof 10 to pass through. It is clear that when the lid 12 is next closed, the actuator 54 exerts an opposite action, bringing the lever 18 towards the plate 38 and thereby causing the parallelogram linkage 24 to pivot in the opposite direction, causing the lid 12 to return to the axis 22 and to rotate about it.

The boot lid mechanism of the invention thus gives the lid 12 of the boot 14 a dual possibility of motion in a way which is both simple and effective.

Figure 7:
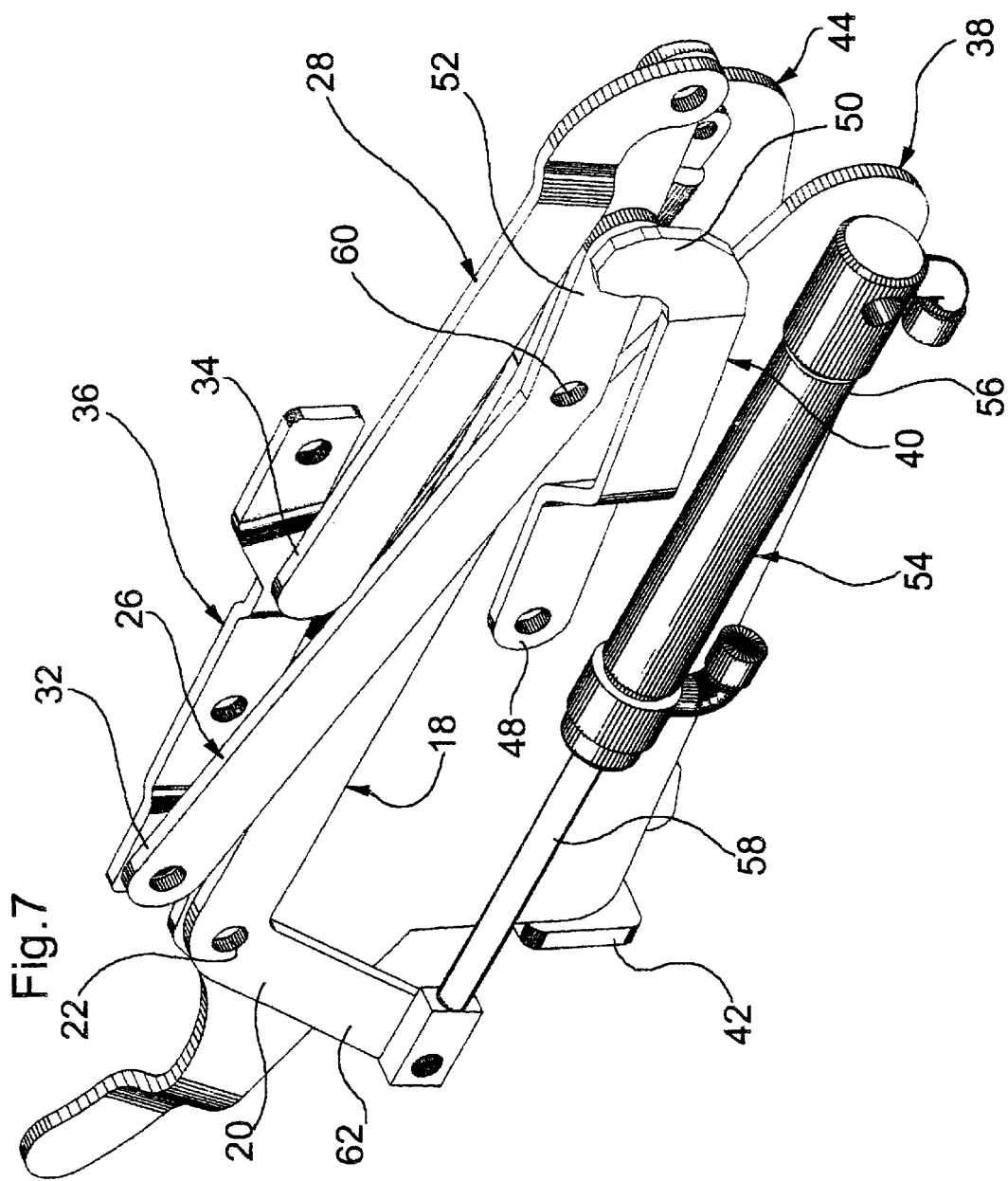
FIG. 7 is a perspective view of a variant of the boot lid mechanism of the invention.
Figure 8:
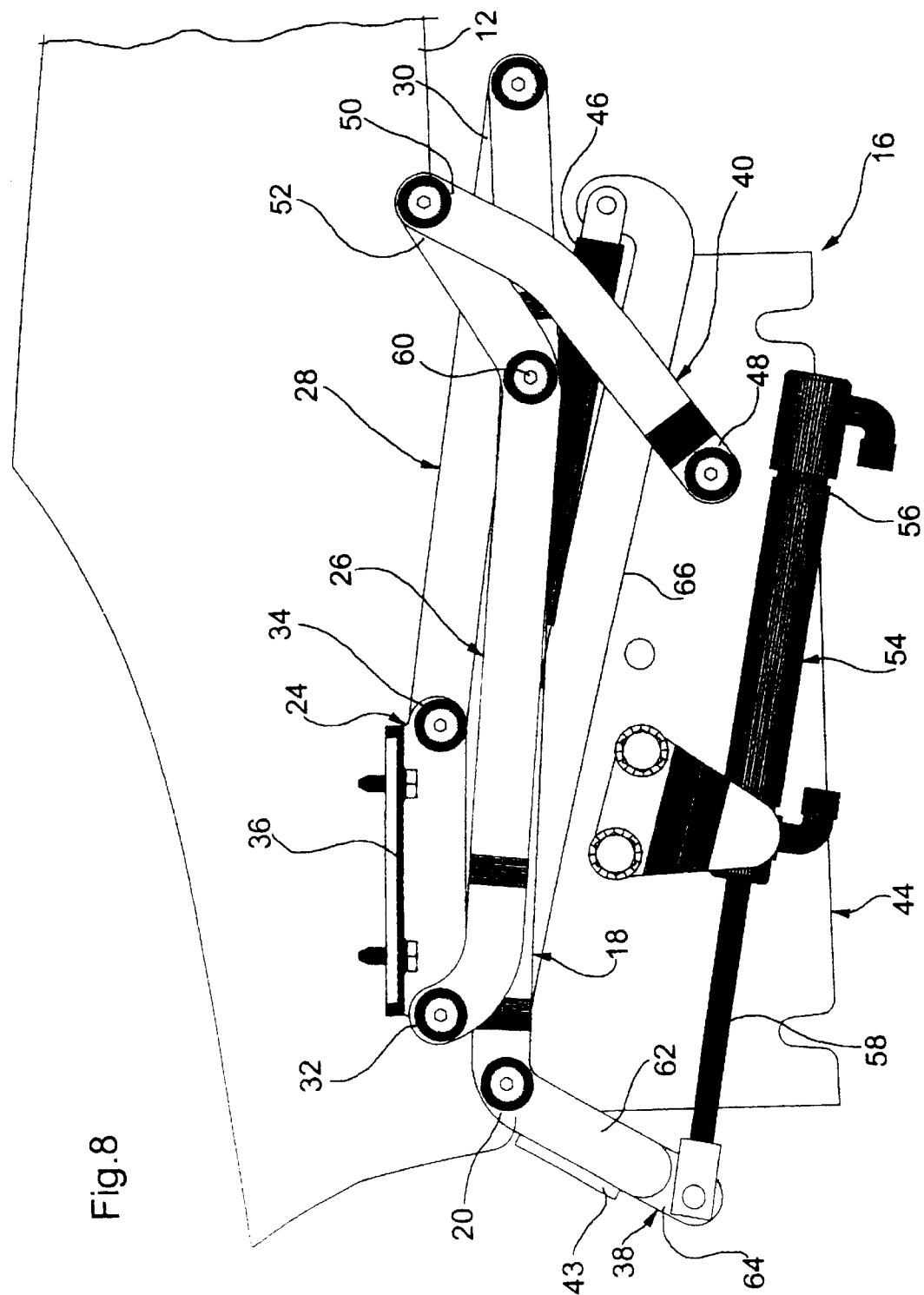
FIG. 8 is a side view of a further variant of the boot lid mechanism of the invention.
Figure 9:
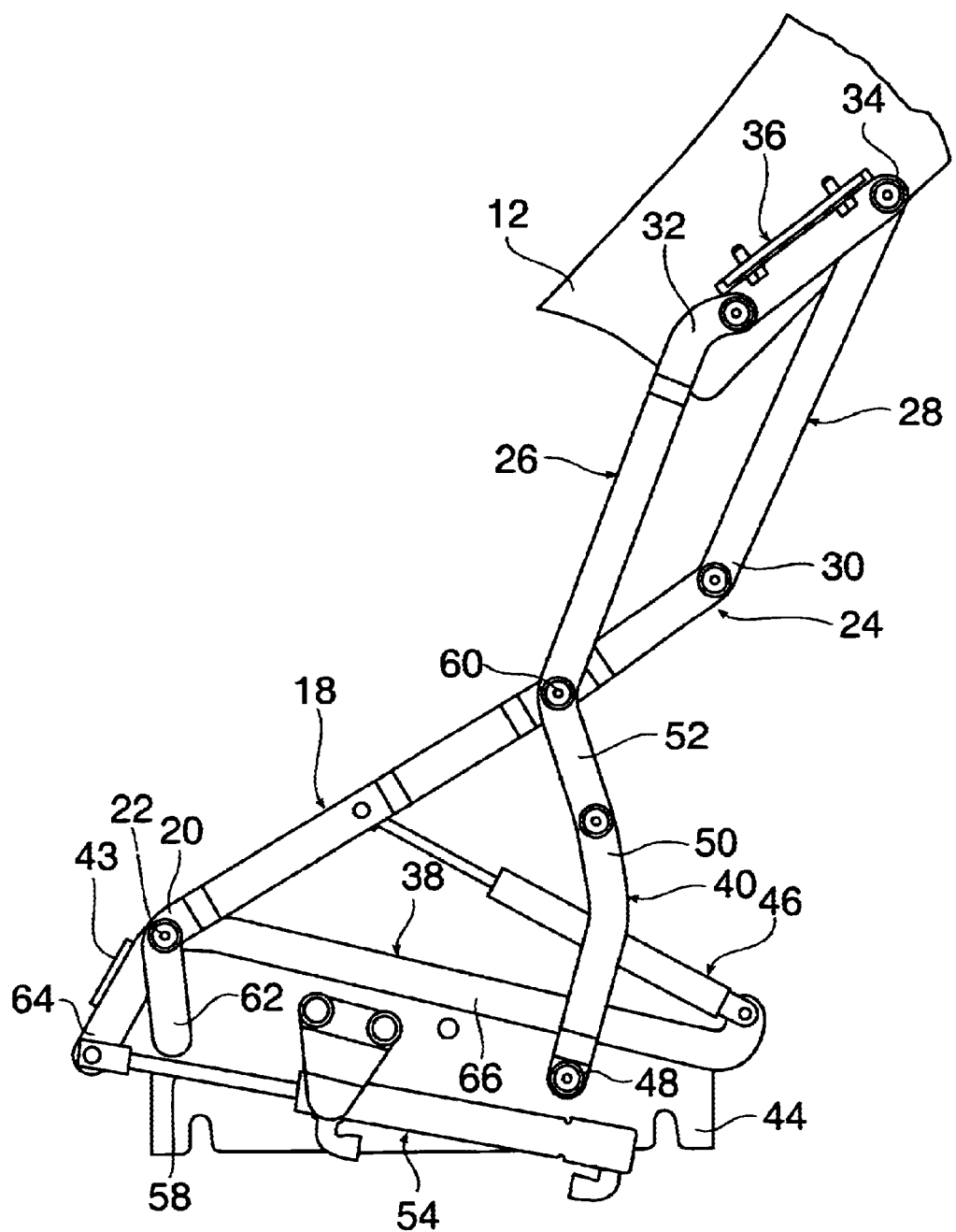
FIGS. 9 and 10 are side views of the boot lid mechanism of FIG. 8 in respective different operating configurations.

FIG. 7 illustrates a variant of the device of the invention. In this case, as opposed to the description referring to the preceding Figures, the end 20, pivoted about the axis 22, of the main lever 18, has an extension 62 which is acted on by the piston 58 of the actuator member 54.

Operation of the unit is substantially the same as that described above. In particular, a joint pivoting motion of all components during normal opening of the lid 12 for loading or unloading items from the boot, or movement of the main lever 18 away from the plate 38, thereby extending the parallelogram linkage 24 so as to allow the roof 10 to pass through, can take place in the alternative.

FIGS. 8 to 12 illustrate a variant of a unit of the boot lid mechanism of the invention. In this case, as opposed to the description relating to the preceding drawing, the auxiliary member 38 is in the form of an additional lever, with a first arm 64 and a second arm 66 which extend on opposite sides of the pivot point about the axis 22. In addition, the cylinder 56 of the actuator member 54 is pivotally attached to the fixed plate 44 while the free end of the piston 58 is pivotally attached to the free end of the first arm 64 of the member 38, which arm 64 also has a transverse lug 43 extending so as to bear against the extension 62 of the lever 18. The first end 48 of the rod 40 is also pivotally attached to the fixed plate 44.

Figure 10:
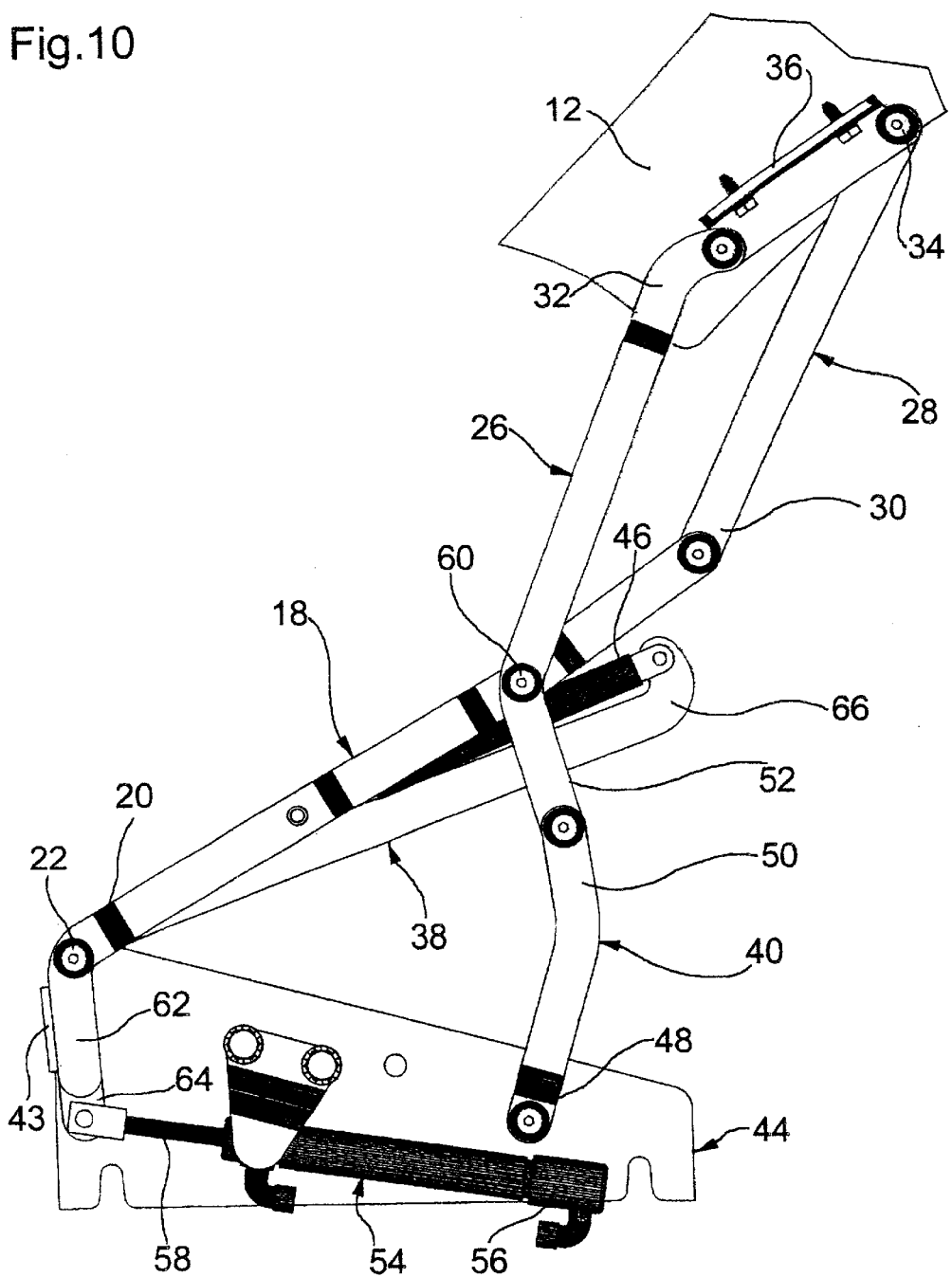
Figure 11:
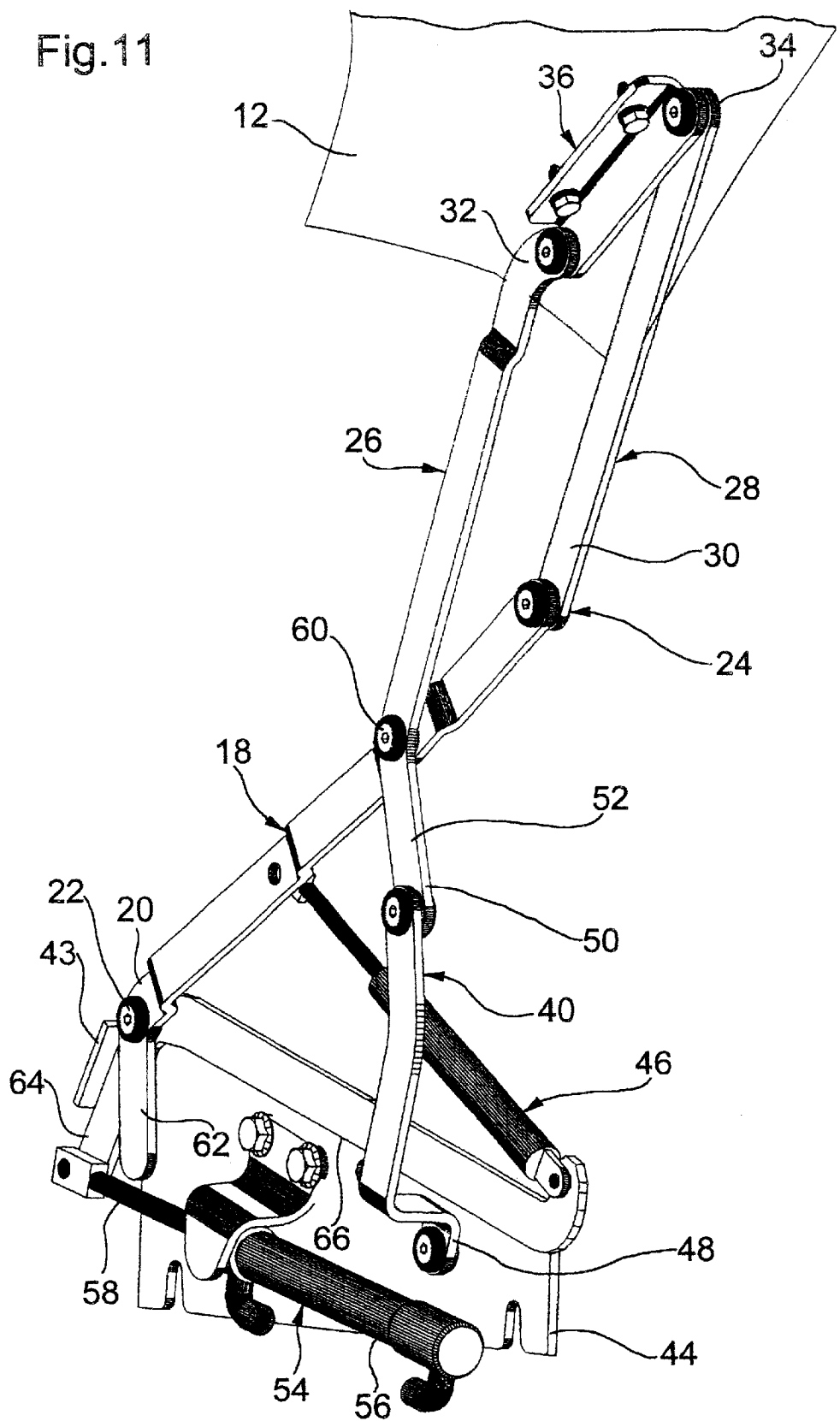
FIGS. 11 and 12 are perspective views corresponding to FIGS. 9 and 10 respectively.
Figure 12:
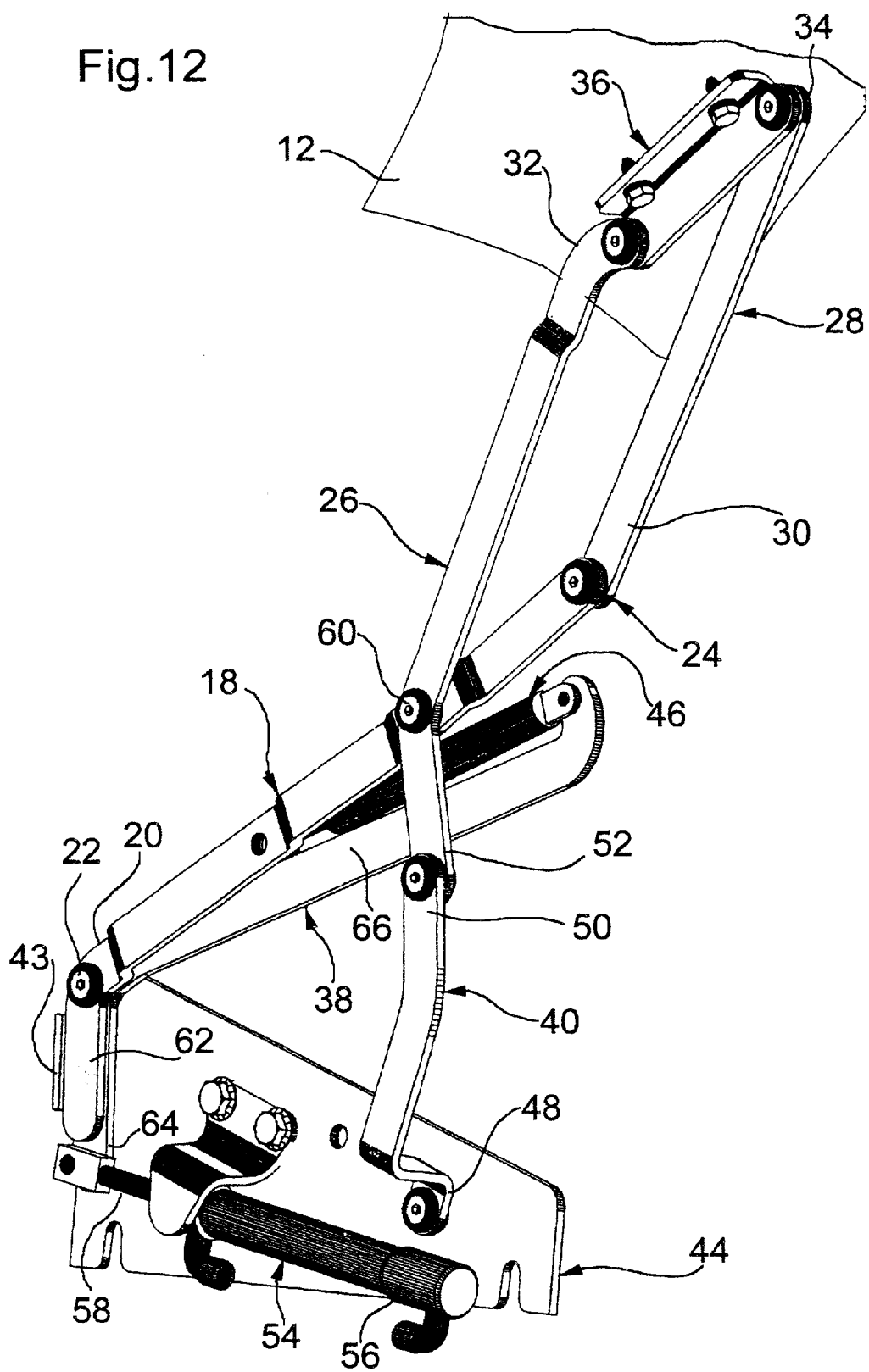

Starting from the rest position (FIG. 8), in this variant the lid 12 goes through a combined motion, pivoting about the axis 22 and moving away therefrom both during routine opening of the boot for the loading or unloading of baggage (FIGS. 9, 11) and during folding or unfolding of the roof (FIGS. 10, 12).

In the first case (FIGS. 9, 11), manual lifting of the rear portion of the lid 12 causes the parallelogram articulation 24 to extend and the main lever 18 to pivot about the axis 22. The auxiliary member 38 and the actuator 56 remain in the rest position.

In the second case (FIGS. 10, 12), the actuator 56 causes the first arm 64 of the member 38 to pivot and the arm 64 thereof to cause the lever 18 to pivot and thus extend the parallelogram linkage 24.

Naturally, the principle of the invention remaining the same, manufacturing details and embodiments may vary widely from those described purely by way of non-limitative example, without departing thereby from the scope of the invention. In particular, the present invention covers any type of means for enabling a boot lid to pivot about an axis in the region of the forward portion thereof while moving towards or away from the said axis, independently of whether or not these means enable the lid selectively to accomplish other types of motion.

What is claimed is:

1. A boot lid mechanism for a lid of a boot of a convertible motor car, comprising means for enabling said lid to pivot about an axis situated near a forward portion of the lid and substantially orthoganol to the longitudinal center line of the car, this pivoting motion being accompanied by a movement towards or away from said axis, wherein said means includes at least one, and preferably two units arranged one on each side of said boot, each of said units includes a main lever pivoted about said axis and supporting a parallelogram linkage to which said lid is fixed and further means enabling said lid to move selectively relative to the main lever, and wherein said parallelogram linkage includes a first lever pivotally attached to the main lever by a median portion and a second lever pivotally attached to the main lever by an end portion, the free ends of the first and second levers being pivotally attached to an arm connected to the lid.

2. A mechanism according to claim 1, in which said means for selectively allowing the parallelogram linkage to move relative to the main lever include an auxiliary member pivotable about said axis and operable to strike a fixed stop, a rod with a first end pivotally attached to the auxiliary member and a second end pivotally attached to aproximal end of the first lever, and an actuator member for enabling the main lever to pivot relative to the auxiliary member.

3. A mechanism according to claim 1, including an auxiliary lever-shape member, pivotable about said axis and having a first arm with a lug arranged to strike an extension of the main lever and a second arm, each of said units also including a rod with a first end pivotally attached to a fixed plate and a second end pivotally attached to a proximal end of the first lever, and an actuator member operable to enable the auxiliary member to pivot relative to the fixed plate.

4. A mechanism according to claim 2, in which said actuator member is a fluid-operated actuator comprising a cylinder and a piston.

5. A mechanism according to claim 4, in which said cylinder is pivotally attached to a portion of the auxiliary member opposite to an end of the auxiliary member which is pivotable about the axis and a distal end of the piston is pivotally attached to the main lever.

6. A mechanism according to claim 2, in which said actuator member is electric.

7. A mechanism according to claim 2, in which said auxiliary member is comprised of a plate.

8. A mechanism according to claim 2, in which said fixed stop is a lug projecting transverse the general plane of a fixed plate arranged parallel to the plate comprising the auxiliary member.

9. A mechanism according to claim 8, in which each unit includes a resilient damping member interposed between the fixed plate and the auxiliary member.

* * * * *